(12) United States Patent
Coleman et al.

(10) Patent No.: US 7,621,048 B2
(45) Date of Patent: Nov. 24, 2009

(54) METHOD AND APPARATUS FOR PRODUCING A WHEEL COVER AND VEHICLE WHEEL INCLUDING SUCH A WHEEL COVER

(75) Inventors: Alan Coleman, Southgate, MI (US); Joseph Wolf, Canton, MI (US); Patrick McCorry, Plymouth, MI (US); Thomas E. Heck, Monroe, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 665 days.

(21) Appl. No.: 11/231,612

(22) Filed: Sep. 21, 2005

(65) Prior Publication Data
US 2007/0062040 A1 Mar. 22, 2007

(51) Int. Cl.
*B21D 41/00* (2006.01)
*B21H 1/04* (2006.01)
*B23P 17/00* (2006.01)

(52) U.S. Cl. ............... 29/894.351; 29/894; 29/894.01; 29/894.381; 72/394; 72/402

(58) Field of Classification Search .......... 29/894.01, 29/894.012, 894, 894.351; 295/29
See application file for complete search history.

(56) References Cited

U.S. PATENT DOCUMENTS

| 160,566 | A | * | 3/1875 | Blackman | 72/327 |
| 310,846 | A | * | 1/1885 | Owen et al. | 29/894.012 |
| 329,617 | A | * | 11/1885 | Beach | 29/894.01 |
| 3,750,450 | A | * | 8/1973 | Sharp et al. | 72/353.2 |
| 4,051,708 | A | * | 10/1977 | Beane et al. | 72/354.2 |
| 5,188,429 | A | | 2/1993 | Heck et al. | |
| 5,340,418 | A | | 8/1994 | Wei | |
| 5,360,261 | A | | 11/1994 | Archibald et al. | |
| 5,421,642 | A | | 6/1995 | Archibald | |
| 5,533,261 | A | | 7/1996 | Kemmerer | |
| 5,564,792 | A | | 10/1996 | Archibald | |
| 5,595,423 | A | | 1/1997 | Heck et al. | |
| 6,270,167 | B1 | | 8/2001 | Kemmerer et al. | |
| 6,406,100 | B1 | | 6/2002 | Kinstler | |
| 6,502,308 | B1 | * | 1/2003 | Carfora et al. | 29/894.381 |

* cited by examiner

*Primary Examiner*—David P Bryant
*Assistant Examiner*—Alexander P Taousakis
(74) *Attorney, Agent, or Firm*—MacMillan, Sobanski & Todd, LLC (57) ABSTRACT

This invention relates to a method and apparatus for producing a wheel cover and a vehicle wheel including such a wheel cover. The method for producing the vehicle wheel cover comprises the steps of: (a) providing a tooling fixture including at least a first tooling member and a second tooling member; (b) providing a wheel cover having at least a preformed outer end; (c) positioning the wheel cover onto the tooling fixture wherein the wheel cover is supported on the first tooling member and spaced apart from the second tooling member; (d) actuating the tooling fixture whereby the second tooling member is operative to engage and reshape the outer end of the wheel cover to produce a desired outer end shape; and (e) removing the wheel cover from the tooling fixture.

13 Claims, 8 Drawing Sheets

METHOD AND APPARATUS FOR PRODUCING A WHEEL COVER AND VEHICLE WHEEL INCLUDING SUCH A WHEEL COVER

BACKGROUND OF THE INVENTION

This invention relates in general to vehicle wheels and, in particular, to a method and apparatus for producing a wheel cover and a vehicle wheel including such a wheel cover.

Full or partial vehicle wheel covers of the removable type are well known and have been used for many years to enhance the styling of conventional, stamped wheel discs. Also, it is known to permanently secure a full or a partial wheel cover to a vehicle wheel using a suitable type of an adhesive.

One example of a vehicle wheel construction wherein a wheel cover is permanently secured to a wheel by an adhesive is disclosed in U.S. Pat. No. 5,595,423 to Heck et al. In the Heck et al. patent, the wheel cover includes an outer end which is disposed in a groove formed in an outer peripheral end of the outboard tire bead seat retaining flange such that the cover covers the entire portion of the outer peripheral end of the outboard tire bead seat retaining flange.

SUMMARY OF THE INVENTION

This invention relates to a method and apparatus for producing a wheel cover and a vehicle wheel including such a wheel cover. The method for producing the vehicle wheel cover comprises the steps of: (a) providing a tooling fixture including at least a first tooling member and a second tooling member; (b) providing a wheel cover having at least a preformed outer end; (c) positioning the wheel cover onto the tooling fixture wherein the wheel cover is supported on the first tooling member and spaced apart from the second tooling member; (d) actuating the tooling fixture whereby the second tooling member is operative to engage and reshape the outer end of the wheel cover to produce a desired outer end shape; and (e) removing the wheel cover from the tooling fixture. The apparatus for producing the vehicle wheel cover comprises: a tooling fixture including a first tooling member and a second tooling member, at least the second tooling member being moveable relative to the first tooling member, the first tooling member having a groove formed therein which defines a surface profile and the second tooling member including a portion having a surface profile which is generally complimentary to the surface profile of the groove.

Other advantages of this invention will become apparent to those skilled in the art from the following detailed description of the invention, when read in light of the accompanying drawings.

DETAILED DESCRIPTION OF THE INVENTION

Figure 1:
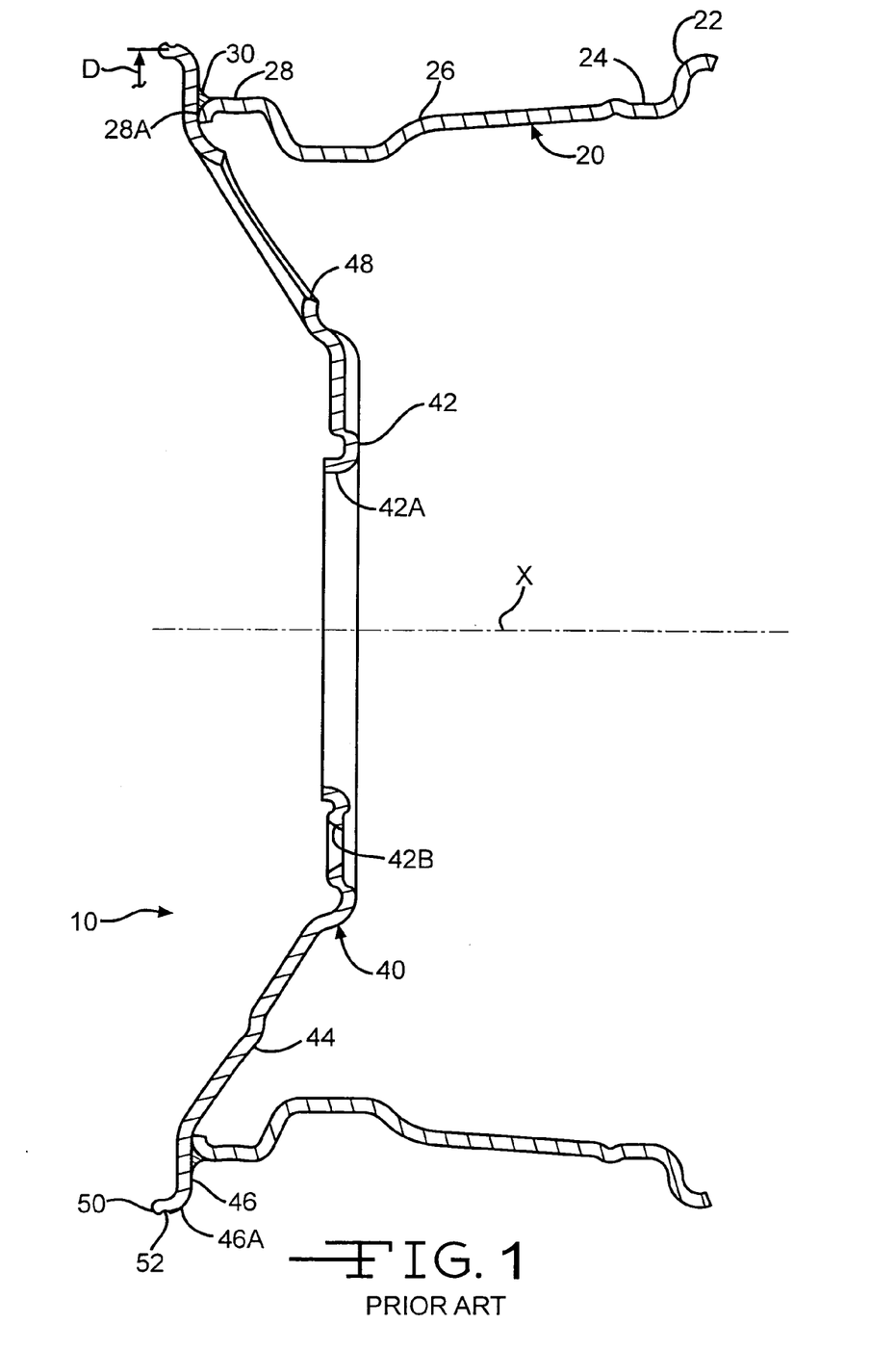
FIG. 1 is a sectional view of a prior art vehicle wheel.

Referring now to the drawings, there is illustrated in prior art FIG. 1 a sectional view of a vehicle wheel, indicated generally at 10, which is adapted to have installed thereon a wheel cover produced in accordance with the present invention. The prior art vehicle wheel 10 can be of any suitable type of material or materials, such as for example, steel, aluminum and alloys thereof, and can be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euro-flange type of wheel such as shown in U.S. Pat. No. 5,564,792 to Archibald, the disclosures of all of these patents incorporated by reference in entirety herein.

As shown in the embodiment illustrated in prior art FIG. 1, the vehicle wheel 10 is a full face fabricated vehicle wheel and includes a "partial" wheel rim, indicated generally at 20, and a full face wheel disc, indicated generally at 40, which are constructed and joined together by suitable means, such as for example by welding. The prior art full face fabricated vehicle wheel 10 defines a horizontal or longitudinal vehicle wheel axis X.

The wheel rim 20 is a fabricated wheel rim and is formed from a suitable material, such as for example, steel, aluminum or alloys thereof, magnesium, or titanium. The wheel rim 20 includes an inboard tire bead seat retaining flange 22, an inboard tire bead seat 24, a generally axially extending well 26, and an outboard tire bead seat 28. The outboard tire bead seat 28 terminates at an outermost end 28A. In this embodiment, the outermost end 28A is turned radially inwardly and a weld 30 is provided to join the wheel rim 20 and the wheel disc 40 together.

The wheel disc 40 is a fabricated wheel disc and is formed from a suitable material, such as for example, steel, aluminum or alloys thereof, magnesium, or titanium. The wheel disc 40 includes a generally centrally located wheel mounting surface or portion 42 and an outer annular portion 44. The outer annular portion 44 defines an outboard tire bead seat retaining flange 46 of the vehicle wheel 10.

The wheel mounting surface 42 of the wheel disc 40 is provided with a centrally located pilot aperture 42A and a plurality of lug bolt receiving holes 42B circumferentially spaced around the pilot aperture 42A (only one of such lug bolt receiving holes 42B illustrated in prior art FIG. 1). The lug bolt receiving holes 42B receive lug bolts (not shown) and nuts (not shown) for securing the vehicle wheel 10 on an axle (not shown) of a vehicle. The wheel disc 40 may also include one or more vent windows 48 formed therein (only one of such windows 48 illustrated in prior art FIG. 1).

As shown in the embodiment of prior art FIG. 1, the outboard tire bead seat retaining flange 46 of the disc 40 includes a generally smooth and rounded outer peripheral end 50. The outer end 50 is provided with a circumferential, radially inwardly facing groove or recess 52 formed in an inner surface 46A thereof. In the embodiment illustrated, the groove 52 has a generally curved or rounded shape. The peripheral end 50 and the groove 52 are preferably formed by a machining operation to predetermined specifications. However, the peripheral end 50 and/or the groove 52 can be formed by other methods. For example, the peripheral end 50 and/or the groove 52 can be formed by a stamping operation or a spinning operation. Preferably, the groove 52 is formed in such a manner that when the wheel cover is installed on the wheel 10 the wheel cover is preferably completely recessed within the groove 52.

Figure 2:
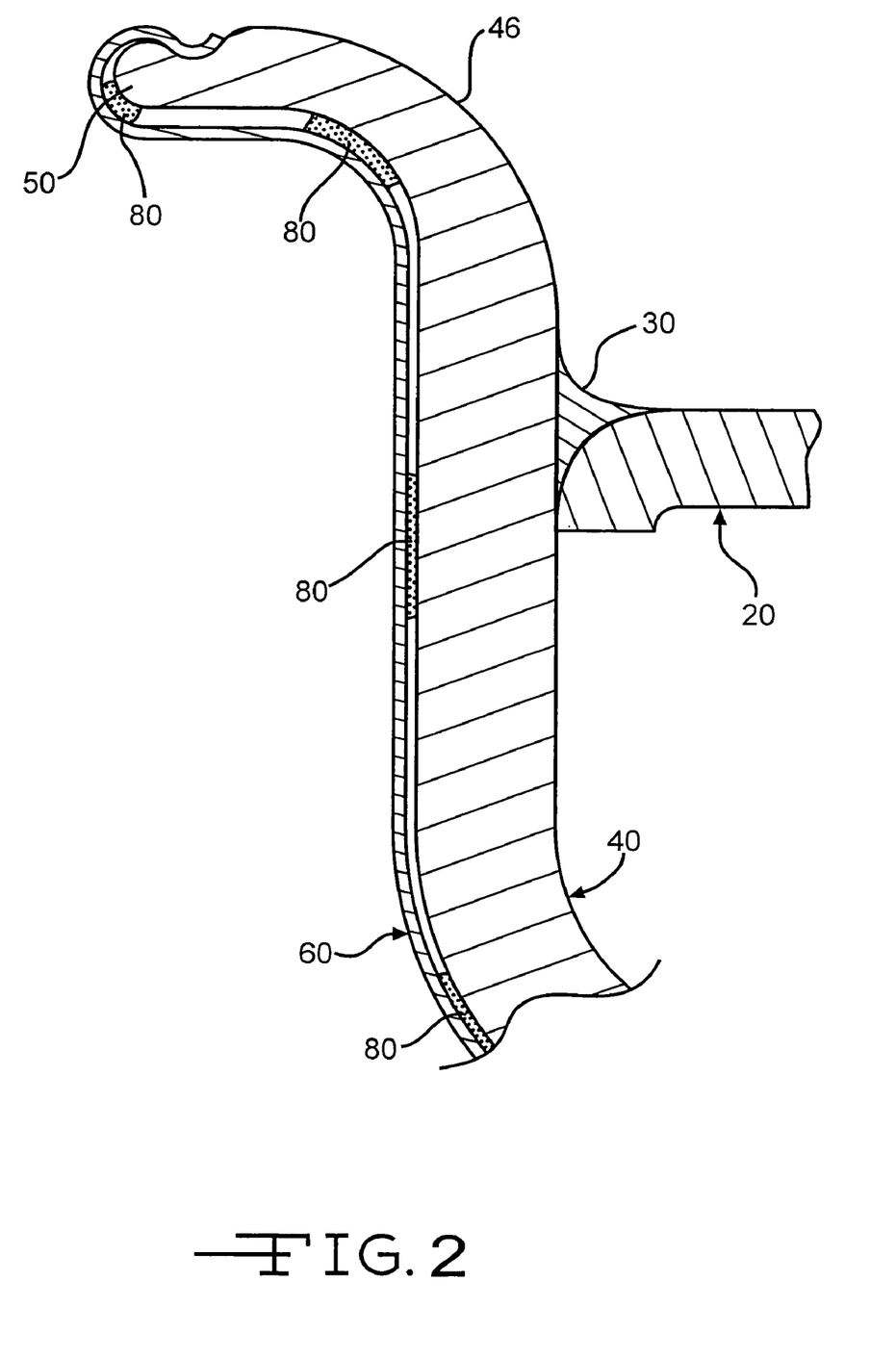
FIG. 2 is a sectional view of a portion of the vehicle wheel illustrated in FIG. 1, including a wheel cover produced in accordance with the present invention.
Figure 3:
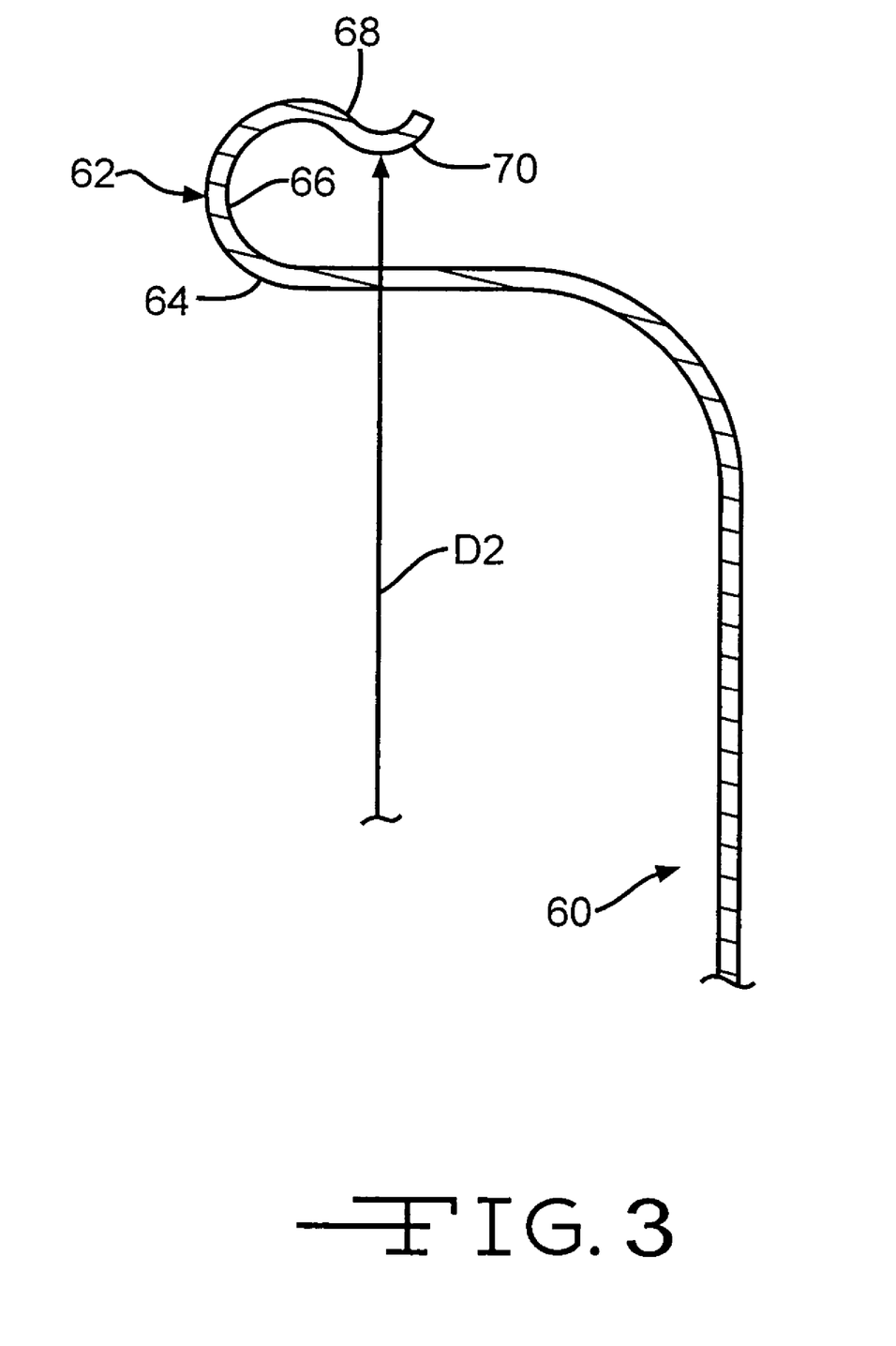
FIG. 3 is another view of the wheel cover illustrated in FIG. 2.
Figure 4:
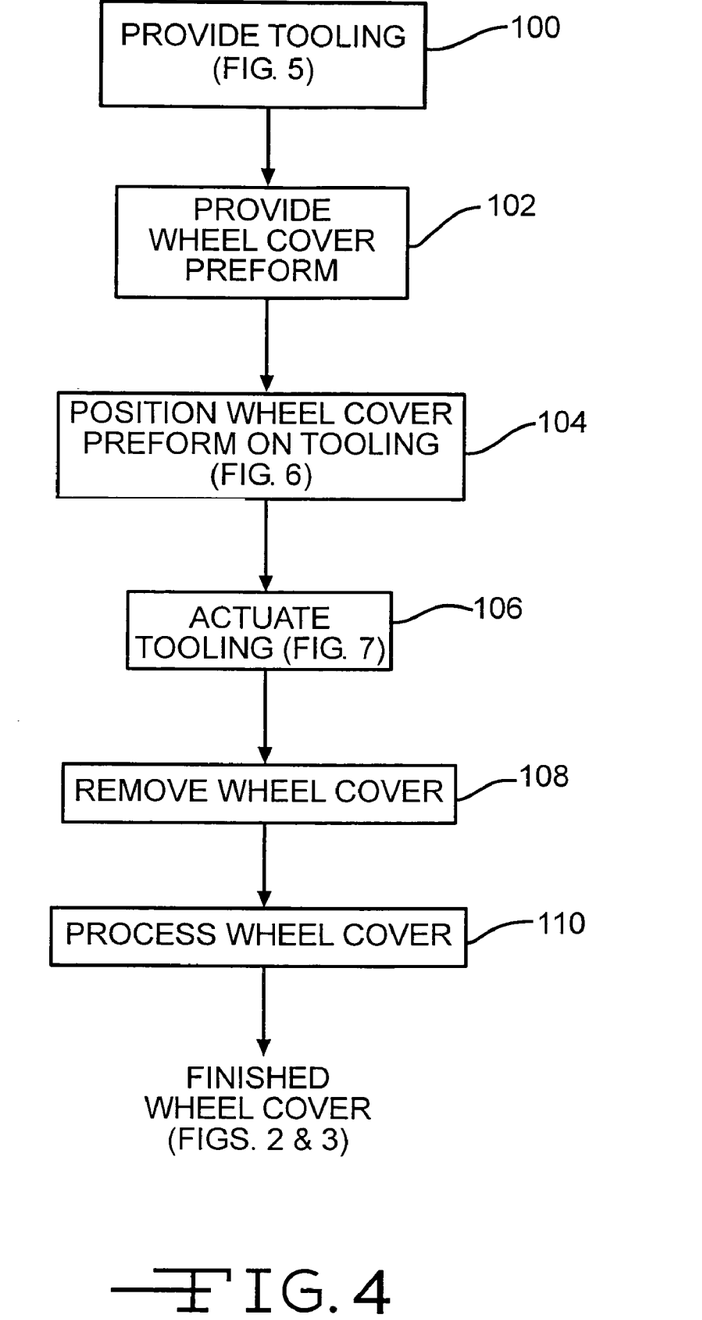
FIG. 4 is a block diagram illustrating a sequence of steps for producing the wheel cover in accordance with the present invention.

Referring now to FIG. 4, there is illustrated a block diagram illustrating a sequence of steps for producing a wheel cover, indicated generally at 60 in FIGS. 2 and 3, in accordance with the present invention. The wheel cover 60 of the present invention can be used in connection with the vehicle wheel 10 illustrated in prior art FIG. 1 or in connection with any other desired type of vehicle wheel.

Figure 5:
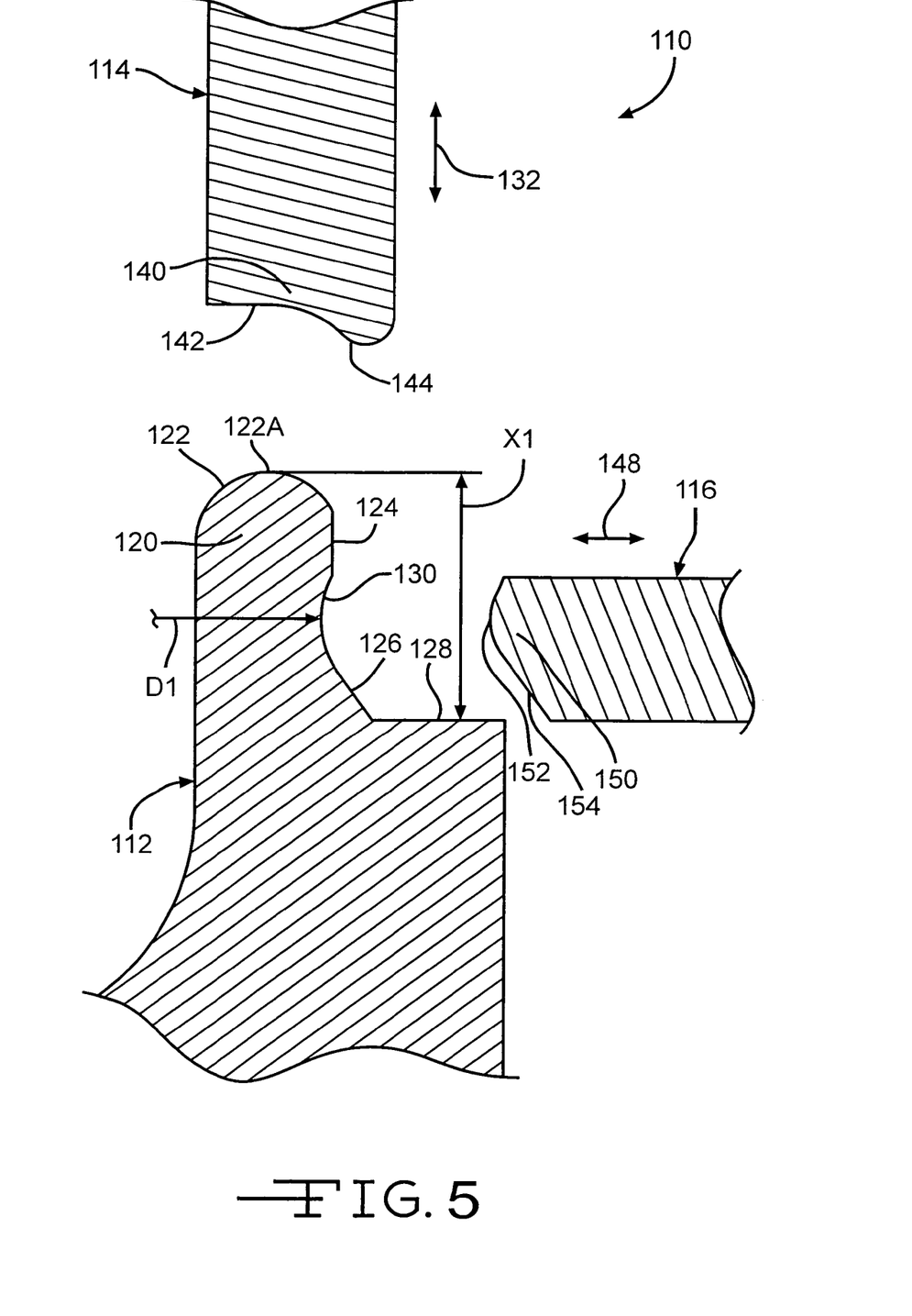
FIG. 5 is a view of a portion of tooling for use in producing the wheel cover illustrated in FIGS. 2 and 3, with only the tooling being shown.

Initially, in step 100, a tooling fixture or apparatus 110, partially shown in FIG. 5, in accordance with this invention is provided to be used to produce the wheel cover 60. As shown in FIG. 5, the tooling fixture 110 includes a first tooling member or anvil 112, a second tooling member or cam slide 116 and a third tooling member or upper pad 114. The first tooling member 112 can be a one-piece tooling member or can be made up of two or more tooling members. In the illustrated embodiment, the first tooling member 112 is a generally annular one-piece tooling member and includes an outer end 120 having a generally rounded first surface 122, a generally flat second surface 124, a generally angled third or intermediate surface 126, and a generally flat fourth surface 128. The outer end 120 further includes an annular groove or recess 130 formed therein at the transition of the second surface 124 to the third surface 126. The recess 130 is preferably in the form of a radius and defines an inner diameter D1 of the first member 112. Also, the fourth surface 128 is preferably spaced apart from an outer endmost surface 122A of the first surface 122 by an axial distance X1, for a purpose to be discussed below. In the illustrated embodiment, the second surface 124 is generally perpendicular to the fourth surface 128 and the third surface 126 is located at an angle, which is shown in the illustrated embodiment as being about 55 degrees, with respect to the fourth surface 128. Alternatively, the profile or construction of the outer end 120 of the first tooling member 112 can be other than illustrated if so desired.

The third tooling member 114 can be a one-piece tooling member or can be made up of two or more tooling members. In the illustrated embodiment, the third tooling member 114 is a one-piece tooling member and is preferably moveable in the direction of arrow 132 between a retracted non-working position (shown in FIGS. 5 and 6), and an extending working position (shown in FIG. 7). In the illustrated embodiment, the third tooling member 114 includes an end 140 provided with a first or inner surface 142 and a second or outer surface 144. The first surface 142 is slightly curved or rounded and the second surface 144 is curved or rounded. As can be seen in the illustrated embodiment, portions of the first surface 142 and the second surface 144 of the third tooling member 114 are generally complimentary to portions of the rounded surface 122 of the first tooling member 112. Alternatively, the profile or construction of the end 140 of the third tooling member 114 can be other than illustrated if so desired The second tooling member 116 is comprised of at least two or more tooling members, such as for example four, nine or twelve tooling members, and is preferably moveable in the direction of arrow 148 between a retracted non-working position (shown in FIGS. 5 and 6), and an extending working position (shown in FIG. 7). In the illustrated embodiment, the second tooling member 116 includes an end 150 provided with a first surface 152 and a second surface 154. The first surface 152 is non-flat or rounded and the second surface 154 is generally flat and angled with respect to the first surface 152. Preferably, as shown in the illustrated embodiment, the curvature or profile of the first surface 152 of the second tooling member 116 is generally complimentary to the curvature or profile of the recess 130 of the first tooling member 112. Alternatively, the profile or construction of the end 150 of the second tooling member 116 can be other than illustrated if so desired.

Next, in step 102, a wheel cover 160 (partially shown in FIG. 6), is provided. The wheel cover 160 can be formed of any suitable material, such as for example, steel, aluminum, and plastic. In the illustrated embodiment, the wheel cover 160 is formed from steel, preferably stainless steel. In the illustrated embodiment, the wheel cover 160 is preferably a preformed wheel cover having a desired final shape or configuration throughout its entire body except for in the area of an outer end 162 thereof. In particular, the wheel cover 160 preferably includes a plurality of openings (not shown) which can correspond to the windows 48 formed in the disc 40. The wheel cover openings preferably extend slightly past edges of the windows 48 to effectively overlap the edges of the windows 48. Also, the body of the wheel cover 160 can either extend inwardly short of the lug bolt openings 42B or can extend past the lug bolt openings 42 depending upon the particular wheel design, such as for example, if a center cap (not shown) is used.

Figure 6:
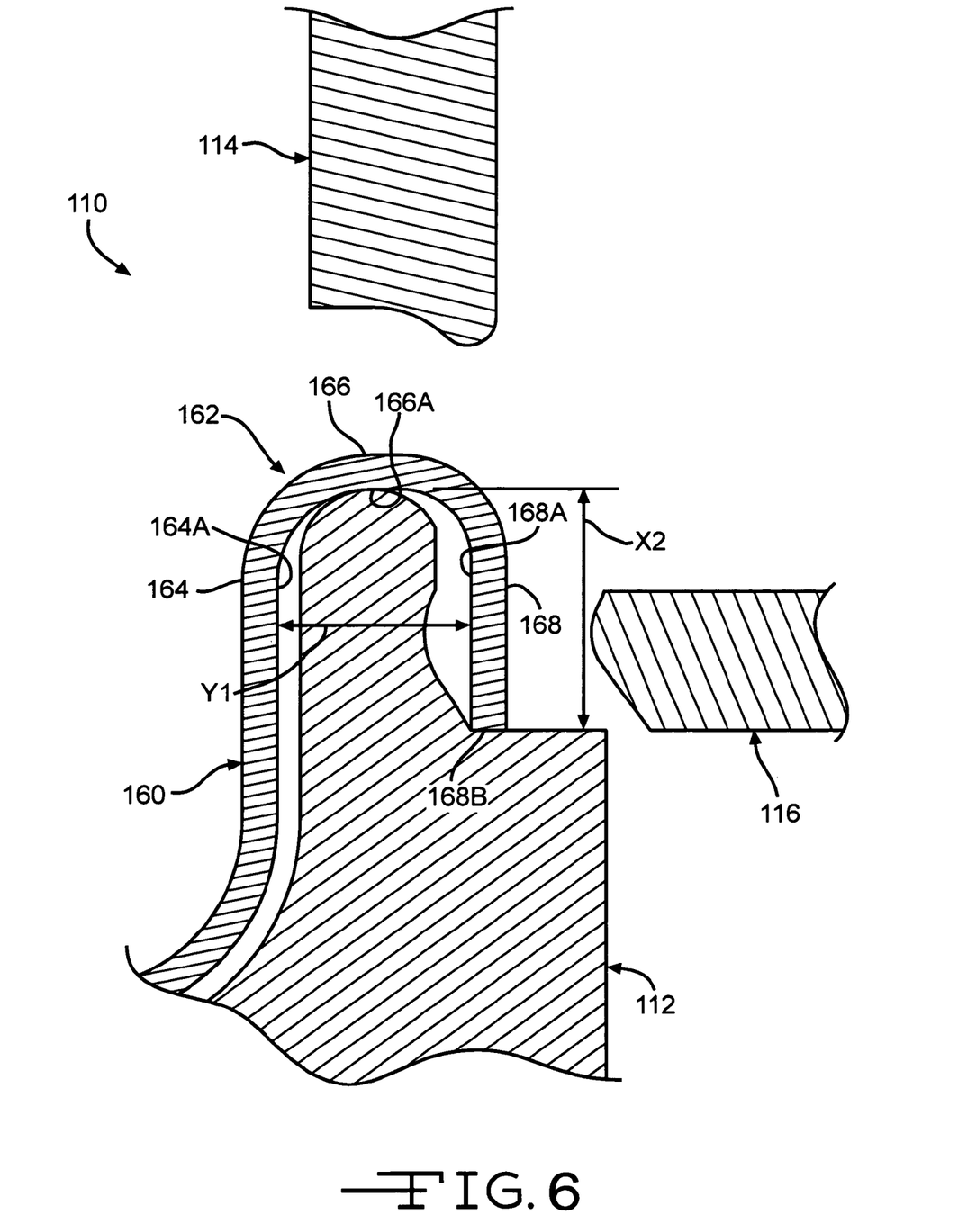
FIG. 6 is another view of the tooling, showing the initial position of the tooling and a portion of a wheel cover preform.

As shown in the embodiment illustrated in FIG. 6, the outer end 162 of the wheel cover 160 is preformed in a generally U-shaped outer end and includes a first or inner portion 164, a second intermediate portion 166, and a third or outer portion 168. In the illustrated embodiment, the first portion 164 and the third portion 168 extend generally parallel with respect to each other and include inner surfaces 164A and 168A, respectively, which are spaced apart from each other by a distance Y1. The second portion 164 is generally rounded. Also, an end surface 168B of the third portion 168 is preferably spaced apart from an inner surface 166A of the second portion 166 by an axial distance X2. Preferably, the axial distance X2 is generally equal to the axial distance X1, for a purpose to be discussed below.

Next, in step 104, the wheel cover 160 is positioned on the tooling fixture 110 as shown in FIG. 6. Following this, in step 106, the tooling fixture 110 is actuated such that the third tooling member 114 and the second tooling member 116 are moved to the extending working positions shown in FIG. 7. In particular, during step 106, the third tooling member 114 is moved in a generally downwardly direction in FIG. 7 and the second tooling member 116 is moved in a generally leftward direction in FIG. 7 to thereby form the finished wheel cover 60 having an outer end 62 provided with the shape best in FIGS. 2 and 3. Preferably, the second tooling member 116 does not engage and shape the outer end of the wheel cover until the third tooling member 114 is in the position shown in FIG. 7.

Figure 7:
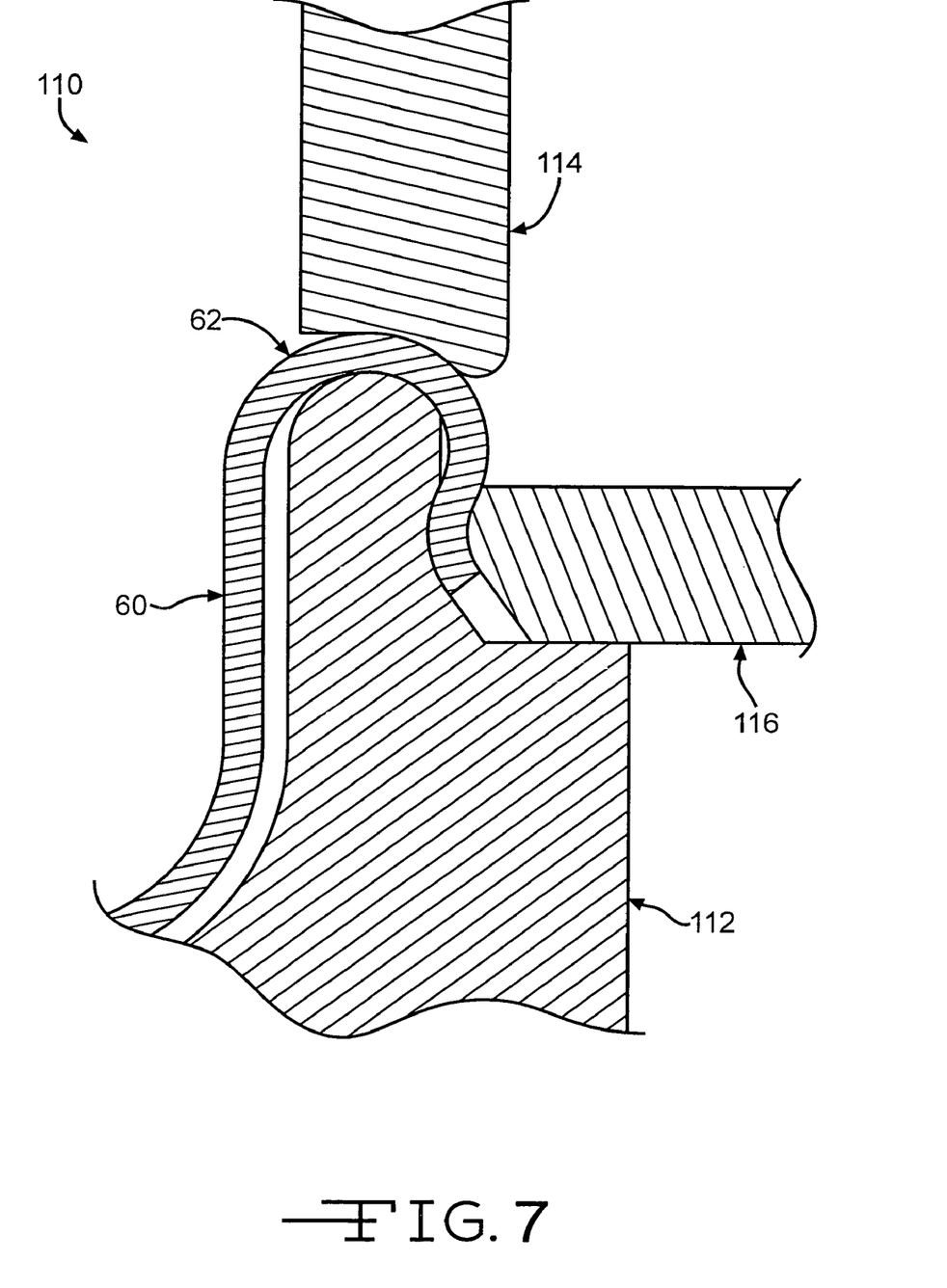
FIG. 7 is another view of the tooling, showing the end working position of the tooling and a portion of the finished wheel cover shown in FIGS. 2 and 3.

As can be seen in FIG. 7, in this embodiment and in this position, a portion of the second portion 166 of the wheel cover 160 is captured or engaged between a portion of the outer end 120 of the first tooling member 112 and a portion of the outer end 140 of the third tooling member 114.

Also, as can be seen in FIG. 7, during step 106, the second tooling member 116 in this embodiment is preferably in contact with and guided by the third surface 128 of the first tooling member 112 as it moves to the extended working position. Also, the rounded surface 152 of the second tooling member 116 initially engages the outer portion 168 of the wheel cover 160 and as it is moved is operative to reshape and form the outer end 62 to a desired final shape or configuration. As can be understood, during step 106, the angled surface 126 of the first tooling member 112 is operative to provide a ramp or slope for the material to move against as the material is reshaped by the second tooling member 116. As discussed above, since the groove 130 of the first tooling member 112 and the surface 152 of the second tooling member 116 have complimentary profiles, the material of the wheel cover is reshaped to resemble such profiles. As a result, the shape of the outer end 62 of the wheel cover 60 can be repeatedly and reliably formed to a preselected shape having predetermined tolerances.

Further, as shown in the embodiment of FIG. 7, since the distances X1 and X2 are preferably equal to one another, the end surface 168B of the outer portion 168 of the wheel cover 160 preferably engages the third surface 128 of the first tooling member 112 so as to be supported thereagainst. However, it is to be understood that due to one or more factors, such as manufacturing tolerances and the particular material of the wheel cover 160, the actual seating or positioning of the wheel cover 160 on the tooling fixture 110 can be other than illustrated in FIGS. 6 and 7. Also, the direction of the movement of one or both of the tooling members 114 and 116 can be other than illustrated if so desired depending upon the particular orientation of the wheel cover 160 and/or the particular design of the tooling fixture 110. Further, the particular tooling member or members which are selectively moveable can be other than illustrated if so desired. Also, the tooling fixture 110 can include any desired number of tooling members. For example, there could be more than or less than the three tooling members shown in the drawings in connection with the illustrated embodiment. For instance, the tooling could include four or more tooling members or could include only two tooling members. In the latter design, the third tooling member 114 and the second tooling member 116 could be formed as a single tooling member or the third tooling member 114 could be eliminated and the tooling fixture 110 only include the tooling members 112 and 116. In addition, depending upon various factors, such as the type of the material, the thickness of the material and/or the particular shape of the wheel cover, prior to or during step 106, it may be desirable to preheat or apply heat to the wheel cover 160 and/or the tooling fixture 110 to assist in the forming of the outer end 120 thereof.

Next, in step 108, the wheel cover 60 is removed from the tooling fixture 110 and can be further processed, if so desired. Preferably, in this embodiment, the wheel cover 60 is polished and/or otherwise cleaned to remove any tooling marks or other surface imperfections and then is painted, chrome-plated or otherwise adorned to provide a decorative finish on the wheel cover 60 during step 110. Alternatively, the wheel cover perform 160 provided in step 102 could be already painted, chrome-plated or otherwise adorned so that step 108 would not have to be performed. However, it is preferred to perform step 110 subsequent to step 106. Also, it is preferred the wheel cover provided in step 102 be preformed as shown in the illustrated embodiment. However, the wheel cover provided in step 102 could not be preformed except for in the area of the outer end portion thereof. In this case, the wheel cover would be formed into a desired final shape in its body portion subsequent to step 106 and preferably prior to step 110.

As best shown in FIG. 3, the outer end 62 of the wheel cover 60 defines an outer surface 64, an inner surface 66, and an outer annular lip 68. The outer annular lip 68 includes a rounded portion 70 which defines an inner diameter D2 of the outer end 62 of the wheel cover 60.

Following step 110, the wheel cover 60 is then secured to the vehicle wheel 10 in any suitable manner. As shown in the embodiment illustrated in FIG. 2, when the wheel cover 60 is assembled onto the wheel 10 the outer end 62 of the wheel cover 60 is disposed in the groove 52 of the vehicle wheel 10. Preferably, during assembly, the outer end 62 initially is biased open as the cover 60 is initially assembled onto the outer end 62 and then returns or springs back to its original shape or nearly its original shape so as to be retained in the groove 52 in a mechanical lock-like manner. To accomplish this, the diameter D1 of the first tooling member 112 is preferably selected so as to be less than an outer diameter D of the groove 52 in the wheel 10 so that in turn, the inner diameter D2 of the wheel cover 60 will be less than the outer diameter D of the groove 52 prior to assembly of the wheel cover 60 onto the wheel 10. The particular dimensional relationship of the diameters D, D1 and D2 will depend upon many factors, such as for example, the particular material of the wheel cover, the thickness of the wheel cover, the natural spring rate of the material of the wheel cover, the desired amount of force selected to assemble the wheel cover onto the wheel. Preferably, as will be discussed, the mechanical lock of the outer end 62 in the groove 52 is for a time sufficient to enable an adhesive(s) to cure in order to permanently secure the wheel cover 60 to the wheel 10. A As shown in the embodiment illustrated in FIG. 2, an adhesive 80 can be disposed between the wheel cover 60 and an outer surface of the wheel disc 40. The adhesive 80 can be of any suitable type, such as for example, a silicone or urethane adhesive and a foam-in-place or expanding foam filler adhesive, and can be selectively applied in predetermined manner and/or amount so as to completely fill the space between the adjacent surfaces of the cover 60 and the wheel 10 or to only fill selective areas or regions between the adjacent surfaces, if so desired.

In the illustrated embodiment, the adhesive 80 is a silicone or urethane adhesive selectively deposited so as to be disposed between only selected portions of the wheel cover 60 and the wheel disc 40 following assembly. Alternatively, depending upon the particular type of adhesive or adhesives which are used, the post assembly adhesive pattern between the wheel cover 60 and the wheel 10 can be other than illustrated if so desired.

Also, in combination with the adhesive(s) or in place thereof, the wheel cover 60 can include mechanical retaining members, such as threaded or non-threaded extensions or posts (not shown), to assist in securing the wheel cover 60 to the wheel 10 for a time sufficient for the adhesive(s) to cure (if adhesive(s) is used) or for securing the wheel cover 60 to the wheel 10.

Figure 8:
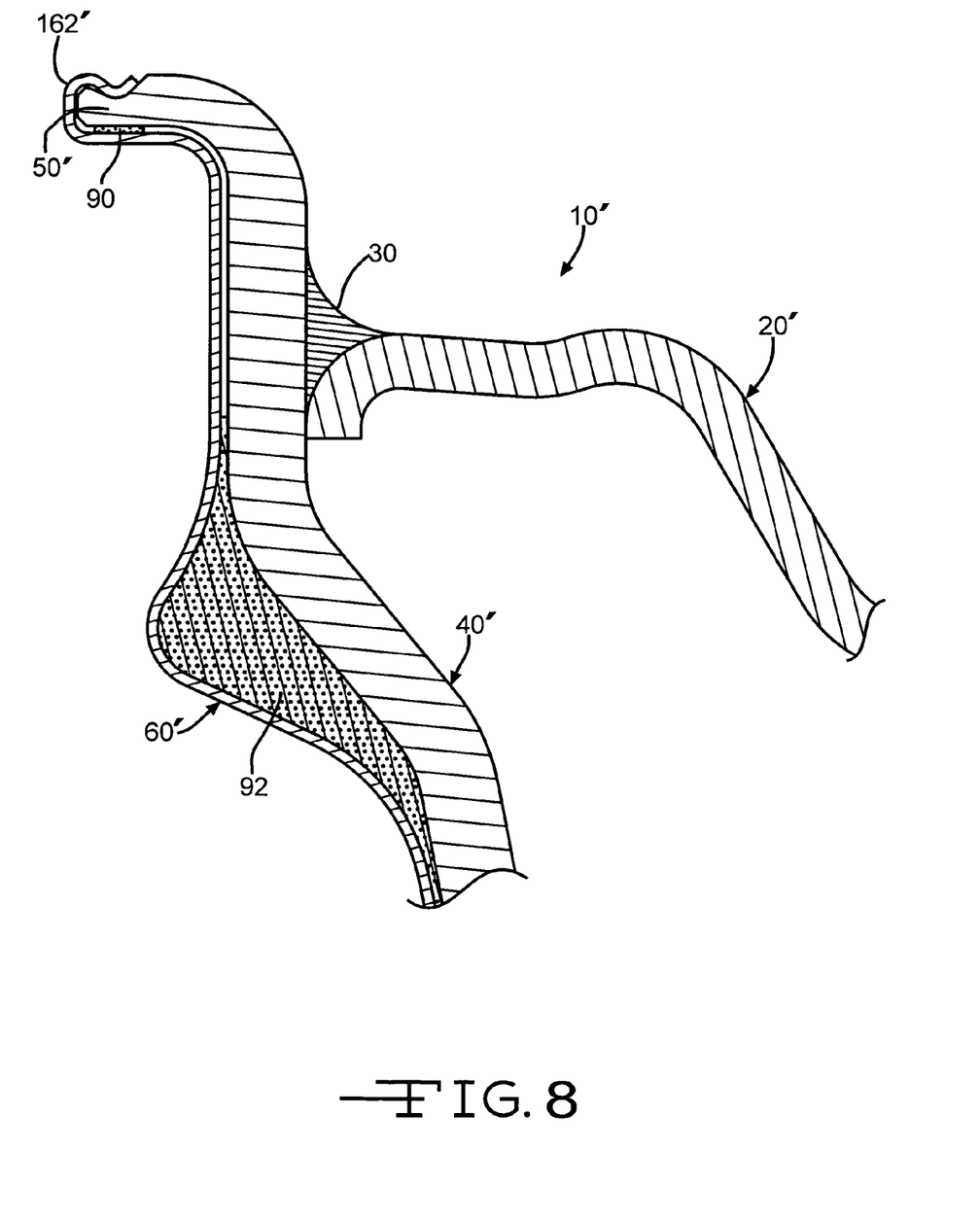
FIG. 8 is a view of a portion of a second embodiment of a vehicle wheel including a wheel cover produced in accordance with the present invention.

Also, as shown in the embodiment illustrated in FIG. 8, a wheel cover 60' having portions which do not closely conform to an outer surface of a wheel disc 40' of a wheel 10' can be produced in accordance with the present invention. The wheel 10' is similar to the wheel 10 and includes a wheel rim 20' joined to the wheel disc 40 by a weld 30. As shown in the embodiment of FIG. 8, a first type of adhesive, such as a non-expandable foam type of adhesive 90, can be selectively disposed between selected portions of the wheel cover 60' and the wheel 10', and a second type of adhesive, such as an expandable foam or foaming type of adhesive 92, can be selectively disposed between selected other portions of the wheel cover 60' and the wheel disc 40', following assembly. Also, in this embodiment, the particular shape of an outer end 50' of the wheel 10' and an outer end 162' of the wheel cover 60' are slightly different from that shown in the embodiment best shown in FIG. 2.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing a vehicle wheel cover which is formed separately from and is adapted to be installed onto a vehicle wheel comprising the steps of:
    (a) providing a tooling fixture including at least a first tooling member, a second tooling member and a third tooling member, the first tooling member including an outer end having a generally rounded surface and an annular groove formed therein, the second tooling member having an outer end having a generally rounded surface which is generally complimentary to the rounded surface of the first tooling member, and the third tooling member having an outer end having a rounded surface which is generally complimentary to the annular groove of the first tooling member;
    (b) providing a wheel cover which is formed separately from and is adapted to be installed onto the associated vehicle wheel, the wheel cover having at least a preformed generally U-shaped outer end and a plurality of openings formed therein which generally correspond to a plurality of windows formed in the associated vehicle wheel;
    (c) positioning the wheel cover onto the tooling fixture wherein the wheel cover is supported on the first tooling member and spaced apart from the second and the third tooling members;
    (d) actuating the tooling fixture whereby the second tooling member is operative to engage and reshape the outer end of the wheel cover to produce a desired outer end shape caused by the action of the rounded surface of the second tooling member engaging and reshaping the outer end of the wheel cover against the annular groove of the first tooling member so as to generally conform to the shape of the annular groove formed in the first tooling member, while a portion of the outer end of the preformed wheel cover is captured between the rounded surface of the outer end of the third tooling member and the rounded surface of the outer end of the first tooling member; and
    (e) removing the wheel cover from the tooling fixture for subsequent installation on the associated vehicle wheel.

2. The method for producing a vehicle wheel cover of claim 1 wherein the first tooling member is a one-piece or a multi-piece member and the second tooling member is a multi-piece member.

3. The method for producing a vehicle wheel cover of claim 1 wherein the preformed wheel cover provided in step (b) is a preformed wheel cover having a desired final shape or configuration throughout its entire body except for in the area of the outer end thereof.

4. The method for producing a vehicle wheel cover of claim 1 wherein during step (d) the outer end of the wheel cover is reshaped to form a rounded portion which defines an inner diameter of the outer end of the wheel cover.

5. A method for producing a vehicle wheel cover which is formed separately from and is adapted to be installed onto a vehicle wheel comprising the steps of:
    (a) providing a tooling fixture including a first tooling member, a second tooling member and a third tooling member, the first tooling member including an outer end having a generally rounded surface and an annular groove formed therein, the second tooling member having an outer end having a generally rounded surface which is generally complimentary to the rounded surface of the first tooling member, and the third tooling member having an outer end having a rounded surface which is generally complimentary to the annular groove of the first tooling member;
    (b) providing a wheel cover which is formed separately from and is adapted to be installed onto the associated vehicle wheel, the wheel cover having at least a generally U-shaped preformed outer end and at least one opening formed therein which generally correspond to at least one window formed in the associated vehicle wheel;
    (c) positioning the wheel cover onto the tooling fixture wherein the wheel cover is supported on the first tooling member and spaced apart from the second and third tooling members;
    (d) actuating the tooling fixture whereby the second tooling member is operative to engage and reshape the outer end of the wheel cover to produce a desired outer end shape caused by the action of the rounded surface of the second tooling member engaging and reshaping the outer end of the wheel cover against the annular groove of the first tooling member so as to generally conform to the shape of the annular groove formed in the first tooling member, while a portion of the outer end of the preformed wheel cover is captured between the rounded surface of the outer end of the third tooling member and the rounded surface of the outer end of the first tooling member;
    (e) removing the wheel cover from the tooling fixture for subsequent installation on the associated vehicle wheel; and
    (f) applying a decorative finish to at least an outer surface of the wheel cover.

6. The method for producing a vehicle wheel cover of claim 5 wherein the first tooling member is a one-piece or a multi-piece member and the second tooling member is a multi-piece member.

7. The method for producing a vehicle wheel cover of claim 5 wherein the preformed wheel cover provided in step (b) is a preformed wheel cover having a desired final shape or configuration throughout its entire body except for in the area of the outer end thereof.

8. The method for producing a vehicle wheel cover of claim 5 wherein during step (d) the outer end of the wheel cover is reshaped to form a rounded portion which defines an inner diameter of the outer end of the wheel cover.

9. A method for producing a vehicle wheel comprising the steps of:
    (a) providing a tooling fixture including at least a first tooling member, a second tooling member and a third tooling member, the first tooling member including an outer end having a generally rounded surface and an annular groove formed therein, the second tooling member having an outer end having a generally rounded surface which is generally complimentary to the rounded surface of the first tooling member, and the third tooling member having an outer end having a rounded surface which is generally complimentary to the annular groove of the first tooling member;

(b) providing a wheel cover which is formed separately from and is adapted to be installed onto the vehicle wheel, the wheel cover having at least a generally U-shaped preformed outer end and a plurality of openings formed therein which generally correspond to a plurality of windows formed in the associated vehicle wheel;

(c) positioning the wheel cover onto the tooling fixture wherein the wheel cover is supported on the first tooling member and spaced apart from the second and the third tooling members;

(d) actuating the tooling fixture whereby the second tooling member is operative to engage and reshape the outer end of the wheel cover to produce a desired outer end shape caused by the action of the rounded surface of the second tooling member engaging and reshaping the outer end of the wheel cover against the annular groove of the first tooling member so as to generally conform to the shape of the annular groove formed in the first tooling member, while a portion of the outer end of the preformed wheel cover is captured between the rounded surface of the outer end of the third tooling member and the rounded surface of the outer end of the first tooling member;

(e) removing the wheel cover from the tooling fixture;

(f) providing a vehicle wheel having an outboard tire bead seat retaining flange having a groove formed in an outer peripheral end thereof;

(g) assembling the wheel cover to the vehicle wheel wherein during assembly the outer end of the wheel cover is initially biased open as the wheel cover is initially assembled onto the outer end and then the outer end of the wheel cover returns to nearly its original shape as the outer end of the wheel cover is retained in the groove in a mechanical lock-like manner.

10. The method for producing a vehicle wheel cover of claim 9 wherein the first tooling member is a one-piece or a multi-piece member and the second tooling member is a multi-piece member.

11. The method for producing a vehicle wheel of claim 9 wherein during step (d) the outer end of the wheel cover is reshaped to form a rounded portion which defines an inner diameter of the outer end of the wheel cover, and wherein the groove of the wheel cover provided step (f) defines an outer diameter of the groove, and wherein prior to step (g), the inner diameter of the outer end of the wheel cover is less than the outer diameter of the groove.

12. The method for producing a vehicle wheel cover of claim 9 wherein the preformed wheel cover provided in step (b) is a preformed wheel cover having a desired final shape or configuration throughout its entire body except for in the area of the outer end thereof.

13. The method for producing a vehicle wheel cover of claim 9 further including prior to step (g), the step of applying a decorative finish to at least an outer surface of the wheel cover.

* * * * *

UNITED STATES PATENT AND TRADEMARK OFFICE
CERTIFICATE OF CORRECTION

PATENT NO. : 7,621,048 B2  Page 1 of 1
APPLICATION NO. : 11/231612
DATED : November 24, 2009
INVENTOR(S) : Coleman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Twenty-sixth Day of October, 2010

David J. Kappos
*Director of the United States Patent and Trademark Office*